United States Patent [19]

Haimerl

[11] Patent Number: 5,285,546
[45] Date of Patent: Feb. 15, 1994

[54] SHOE CHARACTERIZED BY A PLASTIC WELT

[75] Inventor: Franz Haimerl, Jetzendorf, Fed. Rep. of Germany

[73] Assignee: LOWA-Schuhfabrik Lorenz Wagner GmbH & Co. KG, Jetzendorf, Fed. Rep. of Germany

[21] Appl. No.: 689,264
[22] PCT Filed: Nov. 28, 1989
[86] PCT No.: PCT/EP89/01444
   § 371 Date: May 22, 1991
   § 102(e) Date: May 22, 1991
[87] PCT Pub. No.: WO90/06067
   PCT Pub. Date: Jun. 14, 1990

[30] Foreign Application Priority Data

Nov. 28, 1988 [DE] Fed. Rep. of Germany ....... 3840087

[51] Int. Cl.$^5$ ............................................. A43C 13/08
[52] U.S. Cl. ................................. 12/142 E; 36/14; 36/12; 12/142 T
[58] Field of Search ............. 36/12, 14, 17 R, 9 R, 36/55; 12/142 E, 142 T

[56] References Cited

U.S. PATENT DOCUMENTS

| | | | |
|---|---|---|---|
| 1,278,140 | 9/1918 | Gorden | 36/14 |
| 1,289,662 | 12/1918 | Clark | 36/14 |
| 1,699,472 | 1/1929 | Lundy | 36/14 |
| 1,735,986 | 11/1929 | Wray | 36/14 |
| 1,853,034 | 4/1932 | Bradley | 36/14 |
| 2,481,389 | 9/1949 | Campagna | 36/14 |
| 2,675,632 | 4/1954 | Levin | 36/12 |
| 3,863,466 | 2/1975 | Auberry et al. | |
| 4,599,810 | 7/1986 | Sacre | 36/55 |
| 4,809,447 | 3/1989 | Pacanowsky et al. | 36/9 R |
| 4,819,345 | 4/1989 | Mulcahy et al. | 36/17 R |
| 4,858,340 | 8/1989 | Pasternak | 36/12 |
| 4,899,465 | 2/1990 | Bleimhofer et al. | 36/14 |

FOREIGN PATENT DOCUMENTS

| | | | |
|---|---|---|---|
| 555930 | 4/1957 | Belgium | 36/12 |
| 0284638 | 4/1987 | European Pat. Off. | |
| 3712901C1 | 4/1987 | Fed. Rep. of Germany | |
| 8717201.1 | 7/1987 | Fed. Rep. of Germany | |
| 1070892 | 8/1954 | France | 36/14 |
| 303321 | 11/1932 | Italy | 36/14 |
| 77500 | 7/1931 | Sweden | 36/14 |
| 14822277 | 10/1973 | United Kingdom | |

Primary Examiner—Steven N. Meyers
Attorney, Agent, or Firm—Brumbaugh, Graves, Donohue & Raymond

[57] ABSTRACT

A shoe with a waterproof lining (16) comprises a shaft (12) connected to a marginal strip (12b) made of a material which does not conduct water. The marginal strip (12b) is attached to the insole (10). A seal (24) is arranged between the marginal strip (12b) and the lining (16). The sole structure (14) is not attached to the marginal strip (12b). The seal (24) is made of a sealing material which is introduced between the marginal strip (12b) and the waterproof lining (16) independently of the sole structure (14).

35 Claims, 6 Drawing Sheets

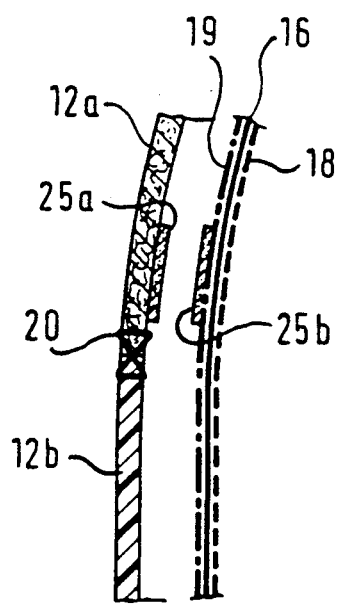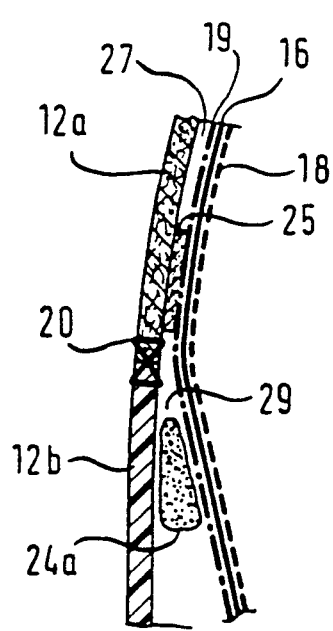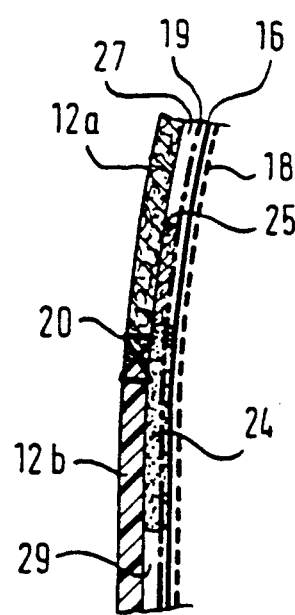

SHOE CHARACTERIZED BY A PLASTIC WELT

BACKGROUND OF THE INVENTION

The invention relates to a shoe with an upper, an insole connected to the upper, a sole construction connected to the upper and a substantially waterproof lining, the upper which consists of a material of relatively high water-conductivity having connected to it a marginal strip of a material of lesser or no water conductivity which is connected to the insole and which through the interposition of a sealing-tight compound bears on the waterproof lining in a waterproof fashion, the sole structure having at least one per se watertight layer which is connected in watertight manner to the outside of the marginal strip.

Modern lining materials such as are commercially available for example under the trade mark Goretex(®), provide for the waterproof lining of shoes without impeding their permeability to vapour. Basically, two systems are known. In the case of a first system, a complete sock is inserted or rigidly incorporated into the shoe. In the case of a further system, only the upper part of the shoe is lined and watertightness is completed by connecting the lining to a sealing structure in the sole zone. The present invention is concerned with the latter-mentioned system.

It is known from German Patent Specification No. 37 12 901 for the lining material to be continued on the underside of the insole beyond the welt of the upper and to be embedded there into a waterproof coating which is sprayed onto the underside of the insole so forming a sealing-tight continuation of the lining in the sole area.

In the case of a first construction according to this Patent Specification, the upper is formed from a laminate comprising an outer layer, a vapour-permeable membrane as a middle layer and an inner layer. On the inside of the inner layer there may possibly be a lining material. The laminate engages under the insole. In the marginal area of the insole, the laminate is, via its inner layer, rigidly lasted on the insole by the AGO method. A projecting area of the laminate is disposed underneath the insole where it is embedded into a sealing material which is sprayed onto the underside of the insole. This construction is only suitable for producing special shoes in which the upper material, the waterproof membrane and the inner material form one laminate. The connection between the upper material and the insole is established by means of the waterproof membrane and the inner layer so that all the mechanical tensile loadings during production and in operation have to be transmitted through the layered construction of the laminate.

In the case of another construction according to this Patent Specification, leather can be used as the material for the upper. The waterproof lining in this case projects below the edge of the leather and underneath the insole into a sealing-tight material which is again injection moulded onto the underside of the insole. What is not clear in this case is how the mechanical connection is to be established between the insole and the upper material. Again, if one is referring to a laminate joint between the upper material and the waterproof lining, then once again the problem arises that all the tensile forces occurring in the upper material, regardless of whether they are caused during lasting or during use can only be transmitted through the layered bonding between the insole and the upper material. injection moulded onto the underside of the insole. What is not clear in this case is how the mechanical connection is to be established between the insole and the upper material. Again, if one is referring to a laminate joint between the upper material and the waterproof lining, then once again the problem arises that all the tensile forces occurring in the upper material, regardless of whether they are caused during lasting or during use can only be transmitted through the layered bonding between the insole and the upper material.

German Utility Model Specification No. 87 17 201 discloses a shoe in which the upper material is sewn to a marginal strip close to the sole and which consists of a perforated or porous material, for example a netting of synthetic fibres with a mesh size of about 1.5 mm, the threads of the netting possibly being monofilament threads, particularly monofilament polyamide or polyester threads. On its inside, the upper material is lined with a waterproof membrane which is coated with a textile layer on its inside surface which is towards the foot and also with a textile layer on its outside which is towards the upper material. Coated in this way, the membrane is then sewn to the insole together with the marginal strip which consists of a netting material. Then, a sole of waterproof synthetic plastics material is injection moulded on, the shell rim of the sole covering the marginal strip. During injection moulding, the initially liquid sole material is intended to penetrate the pores and holes in the net-like marginal strip and pass through to the outside of the lining material.

Known furthermore from EP-A1-284 638 is a shoe of which the upper consists of an outer upper material, a teflon membrane applied to the inside face of the upper material and a lining which masks the inside face of the teflon membrane. During production of this shoe, the upper which is produced in conventional manner has its ends folded around the insole and fixed to this latter by adhesion and/or by nailing. Applied to the folded-over end of the upper is an intermediate sole which consists of a filling composition and a thin rubber layer. The filling composition is glued to the insole by pressure and heat in order to fill in damage to the upper originating from the fixing and to compensate for any unevenness which may have been caused by the bent-over end on the insole. The outsole is then glued onto the intermediate sole. The intention of this method of production is to ensure that the shoe is sealed off in waterproof fashion and to ensure that the outsole no longer needs to exhibit any sealing properties.

Where this known construction is concerned, the upper material itself, unmodified, extends into the region between the insole and the outsole. If the upper material is water-conductive, in other words if it consists for instance of water-conductive leather or textile material, this means that a water-conductive layer extends into the intermediate space between the insole and the outsole. Even if it is understood that the filling composition is waterproof and prevents further penetration of the water which may have been introduced through the upper material, then it is nevertheless extremely undesirable that due to capillary action of the upper material water may constantly penetrate the intermediate space between the insole and the outsole. This water can lead to rapid rotting of the folded-over end of the upper material which is disposed between the insole and the outsole. Furthermore, the prior art method in which the filling composition is applied to the insole by pressure and heat, necessarily presupposes the presence of a mould which serves to introduce the filling composition so that the shoe manufacturer is limited in his choice of procedures.

On the basis of a shoe such as is defined at the outset the invention is based on the problem of further improving the watertightness of the shoe and of permitting a multiplicity of methods of manufacture.

SUMMARY OF THE INVENTION

In order to resolve this problem, it is according to the invention proposed that the marginal strip should consist of a material which even prior to connection to the sole structure has less or no water-conductivity and in that between the marginal strip and the lining there is a layer of sealing means independent of the sole structure.

The invention also relates to a method of making such a shoe, in which a marginal strip of relatively non-water conductive material is affixed to an upper and, via a pasty or liquid sealing composition, to a water proof lining. This construction is then attached to an insole, after which a waterproof sole is attached.

BRIEF DESCRIPTION OF THE DRAWINGS

FIGS. 9–11 show various production stages in making a shoe according to the invention.

DETAILED DESCRIPTION OF THE INVENTION

Figure 1A:
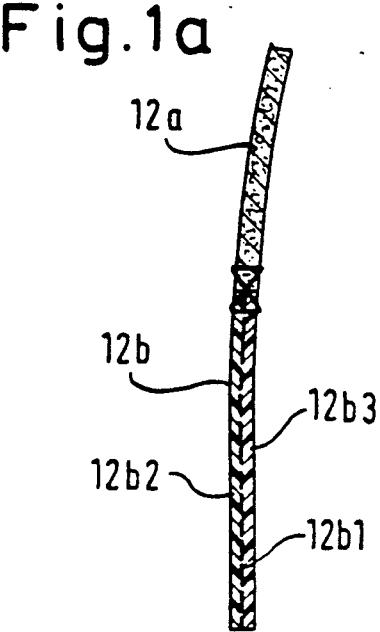
FIG. 1a is a section through an upper material with a sewn-on marginal strip which is formed from a synthetic plastic material.

The independence of the layer of sealing agent from the sole structure makes it possible to incorporate between the marginal strip and the waterproof lining whatever is the optimum sealing agent without, when choosing the sealing agent, having to consider the behaviour of the material as a sole structure. This is clearly in conflict with the prior art solution according to German Utility Model Specification No. 87 17 201 in which, by way of compromise, a material has to be moulded on which is suitable as a sole material on the one hand and which is on the other suitable for sealing the net-like marginal strip in itself, establishing a sealing-tight joint with the waterproof lining. Furthermore, by incorporating the layer of sealing agent independently of the sole structure widens the choice of production method. One is no longer tied to moulding-on the sole but instead the sole structure can be applied in any desired manner according to the particular demands of the shoe and according to the production possibilities offered by the manufacturing workshop. It should however be noted that also in the case of the shoe according to the invention, it is not out of the question for the sole structure to be injection moulded into place.

Whereas in the case of the shoe known from the German Utility Model Specification the marginal strip has to be net-like so that it can be penetrated by the sole material which is injection moulded into place, it is possible with the shoe according to the invention to use a marginal strip which even prior to application of the sole structure has little or not water-conductivity in respect of the upper material and which has no permeability to water. This is a great advantage because it means that the watertightness of the shoe as a whole is improved. In fact, rendering this netting incapable of water-conduction and of entering into a sealing-tight joint with the waterproof lining material after it has passed through the netting.

The marginal strip can be produced from a wide variety of materials. All that is essential is for the marginal strip material to be waterproof and not water-conductive so that during lasting, i.e. during attachment to the insole, it is able to transmit tensile forces exerted during the mechanical part of the production process by pliers used for pulling the upper material over a last and for applying the marginal strip to the sole of the last.

Furthermore, the marginal strip material should be sufficiently flexible and spatially deformable that it can be adapted to the transition curvature between the peripheral surface of the last and the sole surface of the last.

A plurality of materials are available which meet these requirements of the marginal strip material. Since they no longer have to be capable of being penetrated by the sole material as is necessary in the German utility model Specification, all these available materials may exhibit sufficient tensile strength to be able to accommodate the forces which occur during connection to the insole.

In particular, the marginal strip may consist of a synthetic plastics film or a synthetic plastics laminate, for example a laminate which consists of a fabric layer and a synthetic plastics coating on both sides of the fabric layer. It is preferable to use as the fabric layer one which is constructed from synthetic monofilament threads while the synthetic plastics coating is a synthetic polyurethane material.

Furthermore, the marginal strip can be produced on the basis of a fibre fleece which prior to being connected to the sole structure and preferably even prior to being connected to the upper material, has been impregnated by an impregnating agent which suppresses water-conductivity.

The marginal strip can be produced independently of and subsequently joined, particularly sewn, to the upper material, possibly in that the marginal strip abuts the upper material or overlaps the upper material at the junction. In the case of an overlap, it is expedient for the marginal strip material to be applied against the outside of the upper material.

It is however also possible in principle for the marginal strip to be integral with the upper material and to be impregnated with an impregnating agent for suppressing water-conductivity Prior to being joined to the sole structure. It is entirely immaterial from which material the upper is produced. The marginal area of a leather upper may be impregnated but also the marginal area of a fabric upper. What is essential is that only the marginal area of the upper is impregnated in order to prevent variations in the upper portion of the upper material and which might be disadvantageous to the wearing properties and processing properties of the upper material. For example, in the case of a leather upper, it will frequently be necessary to refrain from all over impregnation of the leather upper, in other words impregnation which also embraces the areas outside the marginal strip because such impregnation might be a hindrance to printing on and gluing of the upper material.

It is recommended that the sealing agent be confined to the area between the marginal strip and the waterproof lining on the area of the marginal strip and possibly a narrow marginal zone of the upper material along the connecting line between the upper material and the marginal strip. In fact, if it is desired to avoid an adhesive joint between the waterproof lining and the upper part of the upper material in order to allow ventilation of the intermediate space between the upper material and the waterproof lining and in particular to make it possible for any moisture which penetrates this space to dry out. In order to avoid uncontrolled dispersal of sealing material in the intermediate space between the upper material and the waterproof lining, it is recommended that the sealing agent be defined upwardly by an adhesion line, i.e. an adhesion line between the waterproof lining on the one hand and the marginal strip and/or the upper material on the other. This adhesion line only needs to be about 10 to 15 mm wide and can easily be made when the upper material is assembled together with the waterproof lining, in that an adhesive is brushed onto the upper material and/or the waterproof lining after which the layers are pressed together. There is then below the adhesion line a gap of adequate depth in which the sealing agent can be so distributed that on the one hand it is unable to flow out in an uncontrolled fashion into the area of upper above it and yet on the other hand it does ensure a fully effective seal.

Possible sealing agents are in particular those which are based on Polyurethane, Polyvinyl chloride, natural rubber or synthetic rubber. These sealing agents can in particular be used in the form of paste or less preferably in liquid form. The paste form ensures that the thickness of the layer of sealing agent is retained during further processing and that no areas can be created which are not sealing-tight. For example, bi-component polyurethane sealing agents and moisture hardening polyurethane sealing agents are suitable. When it has set, the sealing agent should retain a continuously flexible consistency so that the seal is assured on a long-term basis.

If the waterproof lining has on its outside a fabric layer such as is often desirable for the protection of waterproof membranes, then care must be taken to see that the sealing agent fully penetrates the textile layer and that the sealing agent bears on the waterproof lining in a watertight fashion. From this point of view, it is advantageous for the textile coating on the outside of the waterproof lining to consist of monofilament threads, particularly monofilament polyamide or polyester threads. Above the sealing agent or above the adhesion line, the waterproof lining should bear loosely against the upper material so that ventilation is possible behind it and so that pressure points on the foot are avoided.

As already mentioned earlier, the shoe construction according to the invention permits of all manner of production methods.

For example, it is possible for the marginal strip to bear on and overlap the underside of the insole and to be connected to the insole in the area of overlap. In order to prevent the forces which take effect between the upper material and the insole during manufacture and operation having to be transmitted by the lining material, it is recommended that in the area of overlap with the insole, the lining end before the marginal strip and that in the area of overlap with the insole outside the edge of the lining, the marginal strip should be connected to the insole. In particular, the marginal strip can be joined to the insole by a hot-melt glue. This means that the so-called AGO process can be used for producing the shoe, the marginal strip being gripped by clamps and pulled over a last and pressed against the insole, rapidly hardening hot-melt glue being incorporated between the marginal strip and the insole. This hot-melt glue is chosen particularly because it sets very quickly in the machine so that the time the shoe spends in the welting or lasting machine is reduced. The hot-melt glue itself could not in the long term undertake any essential sealing function since once it has hardened out it can become brittle in use and then leakage points may form. It is therefore essential that the sealing function be taken over by a special sealing agent and not by the hot-melt glue used in the AGO lasting process.

The marginal strip can also be sewn to the insole, possibly by a cross-sewn seam as will be explained in greater detail hereinafter within the framework of an embodiment; it is immaterial whether the cross-sewn seam also penetrates the edge of the lining.

Furthermore, the marginal strip may also be joined to a downwardly bent-over marginal zone of the insole by a lock-stitch seam. This, too, will be explained in greater detail hereinafter within the framework of an example of embodiment. Here, again, it does not matter if the lock-stitch seam penetrates the edge of the waterproof lining.

Furthermore, the marginal strip can be sewn to a downwardly directed engaging lip on the insole. This, too, will be explained within the framework of an example of embodiment and once again it is immaterial if the seam penetrates the waterproof lining and/or a part of the layer of sealing agent.

Earlier on, attention was already drawn to the fact that the embodiment according to the invention admits of substantial freedom of choice in terms of sole construction.

For example, it is possible for the waterproof layer of the sole structure to be formed by an intermediate sole which can be glued to the marginal strip and possibly also to the upper material itself. The intermediate sole may be constructed as a shell sole, i.e. as a shell sole which is already in shell form before being fitted to the shoe.

Furthermore, the waterproof layer of the shell structure may consist of a waterproof film. This waterproof film may possibly be permeable to water vapour to allow a certain evaporation also in the sole area. In the case of waterproof film, the construction may be such that the marginal strip overlaps the underside of the insole or such that an area of the marginal Strip which is close to the centre of the sole is glued in Sealing-tight manner to the waterproof film and such that an area of the marginal strip which is more remote from the centre of the sole is glued to an intermediate sole. The substantially waterproof lining ought to be permeable to vapour in order to confine the accumulation of water vapour inside the shoe. The function of the watertightness combined with permeability to vapour is fulfilled for instance by films consisting of stretched polytetrafluoroethylene or also by polyester membranes and microporous layers of polyurethane.

To provide optimum avoidance of water penetration into the shoe, it is recommended that the waterproof lining extend into the region of the access edge of the shoe and to be constructed as a sealing-tight bag as far as this rim.

The shoe itself can be constructed as a high-upper shoe or boot, particularly a sports or hiking boot, or also as a half or standard-sized shoe.

The invention further relates to a method of producing a shoe. This shoe comprises an upper which is connected to an insole, a sole structure connected to the upper and a substantially waterproof lining the upper consisting of a material of relatively high water-conductivity and connected to a marginal strip consisting of a material of less or no water-conductivity, the marginal strip furthermore being connected to the insole, the marginal strip furthermore bearing on the lining in watertight fashion through the intermediary of a sealing composition, the sole structure having at least one per se waterproof layer which is connected in watertight fashion to the marginal strip.

It is suggested thereby that the marginal strip be provided on the upper material as a material which will not conduct water and in that the sealing composition should be incorporated in pasty or liquid form between the marginal strip and the waterproof lining, the marginal strip then being fixed to the insole whereupon the waterproof sole structure is finally fitted.

With this method, provision of the sealing agent can be facilitated if, prior to incorporating the sealing agent between the waterproof lining on the one hand and the marginal strip and possibly the upper material, an adhesion line is provided, the sealing agent being introduced into the gap defined by this adhesion line.

The marginal strip can thereby be produced as a separate part and connected to the upper material; it is however also possible to impregnate an integral marginal strip of the upper material.

It must be pointed out once again that in any event the sealing agent has to be provided below the boundary between the upper material and the waterproof marginal strip. It is immaterial whether the sealing agent extends beyond this limit and into the region of the upper but every effort should be made as far as possible to limit the expansion of the layer of sealing agent above this boundary between marginal strip and upper material in order to guarantee in as large as possible an area of the upper shoe a loose application between the waterproof lining and the upper material. The boundary between the upper material and the waterproof marginal strip should be set as low as possible, possibly even in the region of the overlap of marginal strip and insole.

The invention will be explained in greater detail hereinafter with reference to examples of embodiment shown in the accompanying drawings.

Figure 1:
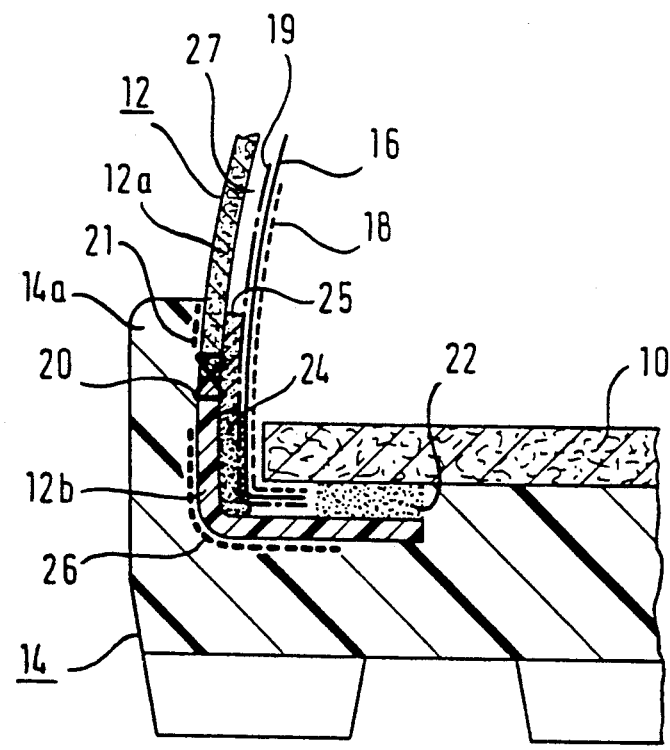
FIGS. 1–8 are sectional views through several shoe constructions embodying the principle of the invention.

FIG. 1 shows the insole 10, the upper 12 and the sole structure 14. On the inside of the upper is a Goretex lining 16 with an inner fabric coating 18 and an outer protective coating 19 of large-mesh polyester or polyamide fabric. The upper 12 is composed of a prepared blank 12a consisting of leather and a marginal strip 12b of synthetic plastics material, for example PVC. The parts 12a and 12b abut and are joined to each other by a zig-zag seam 20. In conventional manner, the marginal strip 12b is connected to the insole 10 at 22 by the AGO method, i.e. is rigidly glued to the insole 10 by a layer 22 of hot-melt glue. The lining 16 extends as far as the underside of the insole 10 but preferably does not extend into the hot-melt glue 22 so that a direct transmission of force between the marginal strip 12b and the insole 10 is established by the hot-melt glue 22. Between the lining 16 and the marginal strip 12b there is a layer 24 of polyurethane sealing agent which is waterproof and which is affixed in a waterproofing manner to the marginal strip 12b and the lining 16. The layer 24 penetrates the fabric 19 and encloses its monofilament threads in a watertight manner. For their part, the threads do not have any lubricating effect. The lining 16 is in particular a film such as is available commercially under the Goretex trade mark. The edge 14a of the waterproof sole 14 masks the seam 20. The sole 14 is connected in waterproof manner to the marginal strip 12b by adhesion 26 and is itself produced from waterproof rubber-like material. It will be recognised that a complete seal in respect of the insole is guaranteed and that in particular penetration of water to the insole is impossible via the upper material because the upper material is not water-conductive in the region of the marginal strip 12b. Furthermore, there is no possibility of moisture penetrating the area 12a of the material finding its way into the intermediate space between the upper 12 and the lining 16 at the insole; this is prevented by the layer 24 of sealing material. The sole 14 can also be injection moulded into position. To protect the seam 20, adhesion 21 is also recommended above the seam 20 between the edge 14a and the upper material 12a.

Figure 1B:
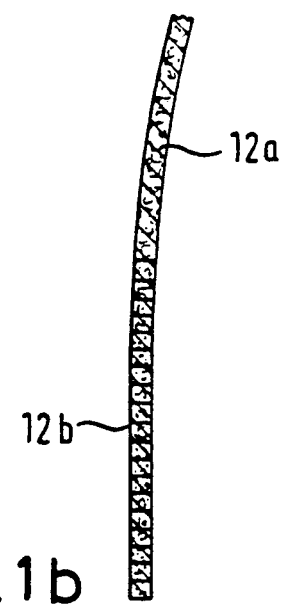
FIG. 1b is a section through an upper material in which the strip is formed by marginal impregnation of the upper material itself.

The upper material 12a can be of any type and may consist of leather or a textile material. According to FIG. 1a, there is connected to the leather 12a a marginal strip 12b which consists of an inner fleece 12b1 and polyurethane layers 12b2 and 12b3. According to FIG. 1b, the marginal strip 12b is integral with the upper material 12a but is treated by impregnation so that it is not permeable to water and is not water-conductive. The impregnation was carried out on the upper material before it was joined to the lining and to the other parts of the shoe.

FIG. 1 again shows an adhesion line 25 above the layer of polyurethane sealing agent as being the upper boundary of the layer of polyurethane sealing agent. This adhesion line 25 ensures that the layer of sealing agent 24 cannot spread into the intermediate space 27 between the upper material 12a and the Goretex lining 16. In this way, it is possible to ensure that the Goretex lining 16, in the upper part of the shoe, bears loosely on the upper material 12 so that this intermediate space 27 can be kept dry by ventilation.

FIGS. 9 to 11 show the incorporation of the sealant layer 24 according to FIG. 1. The upper material 12a with the marginal strip 12b is laid together with the lining material 16, possibly in that it is sewn together with the lining material 16 along the (not shown) access rim of the shoe once the upper material 12a and the lining 16 have been worked into a shape which allows them to be placed on a last. Afterwards, adhesion lines 25a and 25b are brushed onto both the upper material 12a and also the lining, possibly over a width of 5 to 10 mm. According to FIG. 10, these adhesion lines 25a and 25b are then pressed against each other to form the adhesion line 25, somewhat above the seam 20. This produces a gap 29 and into this gap a polyurethane sealing agent of a thickly fluid or pasty consistency is injected, possibly by means of a spray nozzle which is moved lengthwise of the gap 29. The injected line of sealing agent is designated 24a. Then, the marginal strip 12b and the lining 16 are pressed together by a narrowing of the gap 29 to produce the layer 24 of sealing agent without this latter being able to spread upwardly in an uncontrolled fashion. This ensures that the lining 16 above the adhesion line 25 bears loosely against the marginal strip 12b although it is on the other hand ensured that in the narrowed gap 29 the sealing agent 24a undergoes sufficient pressure to be able to penetrate the textile layer 19, enclosing the threads thereof in a sealing-tight fashion and finally bearing in sealing-tight manner on the membrane 16. It is furthermore ensured that the sealing agent layer 24 retains an applied thickness which guarantees a reliable seal vis-a-vis water.

The position of the upper boundary of the sealing agent layer 24 is not critical. It may be above or below the seam 20 according to how the layer 25 of adhesive is applied. The adhesive layer 25 can also be disposed in the region of the marginal strip 12b or may extend above the seam 20. It is however recommended that the adhesive layer 24 be situated as low down as possible in order to have extending down as far as the sole structure an intermediate space 27 which is accessible to air between the upper material and the lining material 16. The sealing agent 24a which constitutes the layer 24 of sealing agent is incorporated either as a bi-component polyurethane sealing agent or as a moisture-hardening polyurethane sealing agent and it should remain continuously flexible under pressure and heat even after it has hardened.

Figure 2:
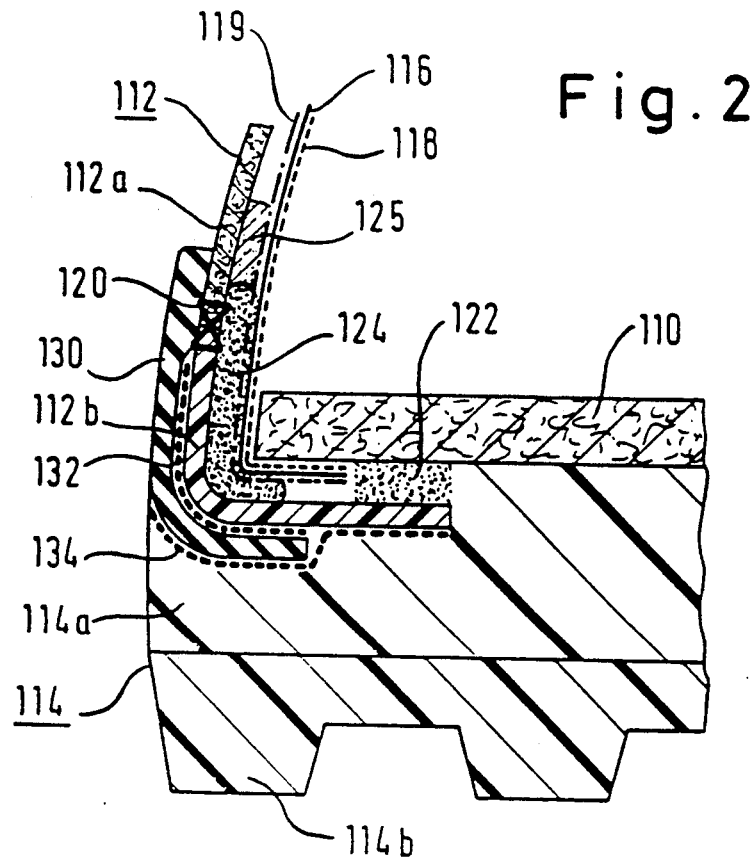

In FIG. 2, analogous parts are identified by the same reference numerals as in FIG. 1 but this time raised by 100. In the case of this embodiment, the marginal strip 112b, the seam 120 and the bottom marginal portion of the leather upper 112a are masked by a waterproof connecting strip 130 of rubber or rubber-like material and the sole structure 114 is adjacent the connecting strip 130 in that it masks this latter from below. At the same time, the connecting strip 130 is at least glued to the marginal strip 112b in watertight fashion by adhesion 132, possibly also being glued to the bottom marginal zone of the leather upper 112a. In this case, the sole structure 114 consists of an intermediate sole 114a and an outsole 114b. The intermediate sole 114a is waterproof and is glued to the connecting strip 130 by adhesion 134. This adhesion 134 can extend also into the zone of the marginal strip 112b.

The layer 124 of sealing agent must be glued to the marginal strip 112b and the lining 116. A further adhesion of the sealing agent layer 124 to the leather upper 112a is advantageous but not necessary.

Figure 3:
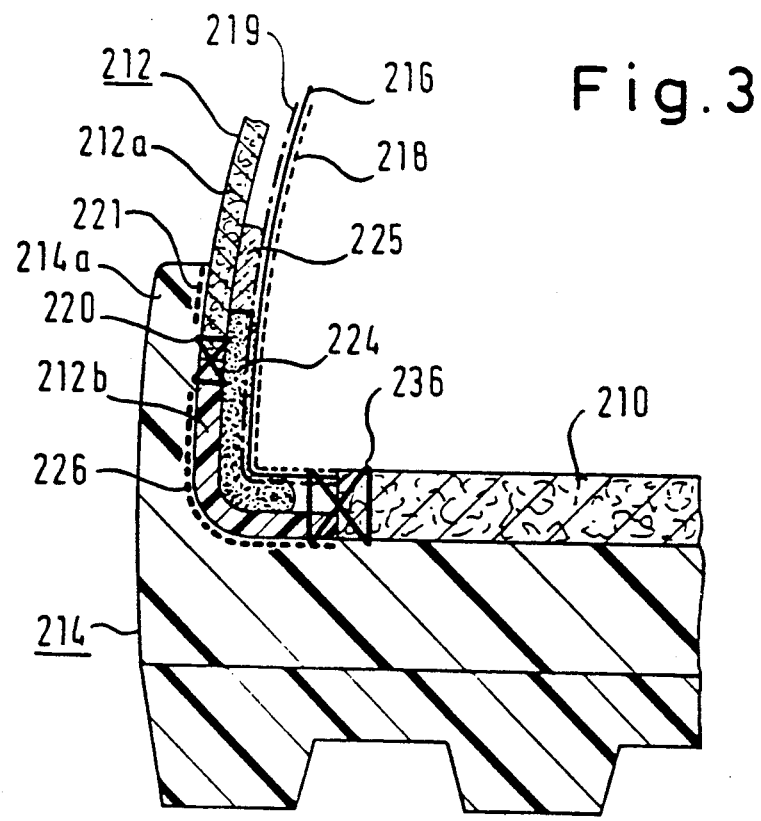

In the case of the embodiment according to FIG. 3, analogous parts are identified by the same reference numerals as in the embodiment according to FIG. 1 but in each case raised by the number 200. With this embodiment, the marginal strip 212b, together with the lining 216, is connected to the insole 210 by a cross-sewn seam 236. The cross-sewn seam 236 is produced in that the marginal strip 212b is placed flat against the insole 210 and has its edge stitched thereto and in that the marginal strip 212b is folded through about 180° into the position shown in FIG. 3. For the rest, the sealing system in FIG. 3 corresponds to that in FIG. 1.

Figure 4:
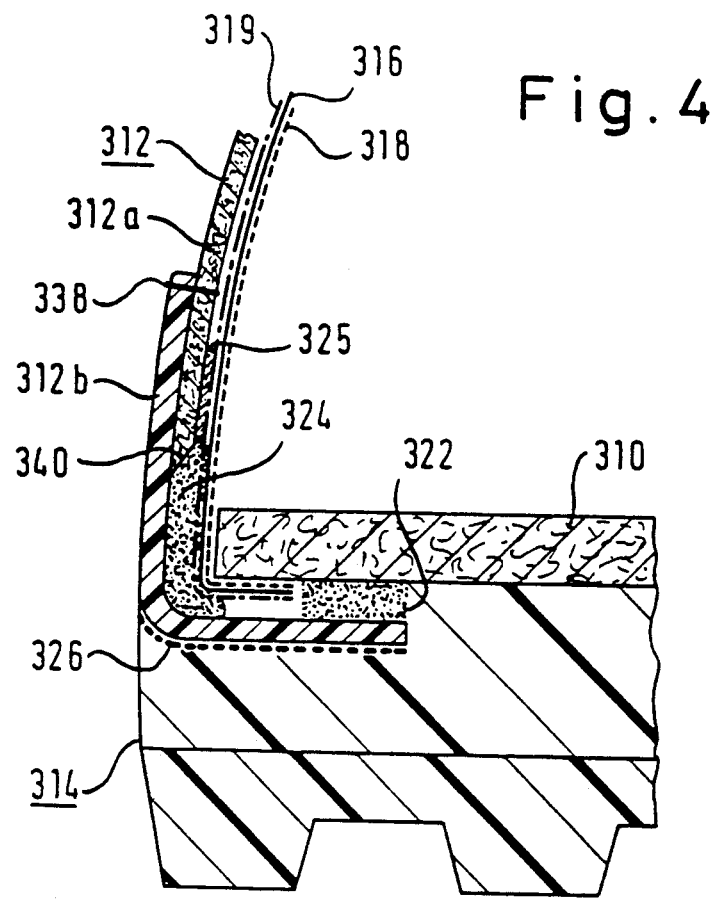

In FIG. 4, analogous parts are identified by the same reference numerals as in FIG. 1, in each case raised by the number 300. In the case of this embodiment according to FIG. 4, the marginal strip 312b is sewn onto the upper part 312a by a lock-stitch seam 338. The upper part 312a is chamfered over at 340. For the rest, the sealing system corresponds to the embodiment shown in FIG. 1.

Figure 5:
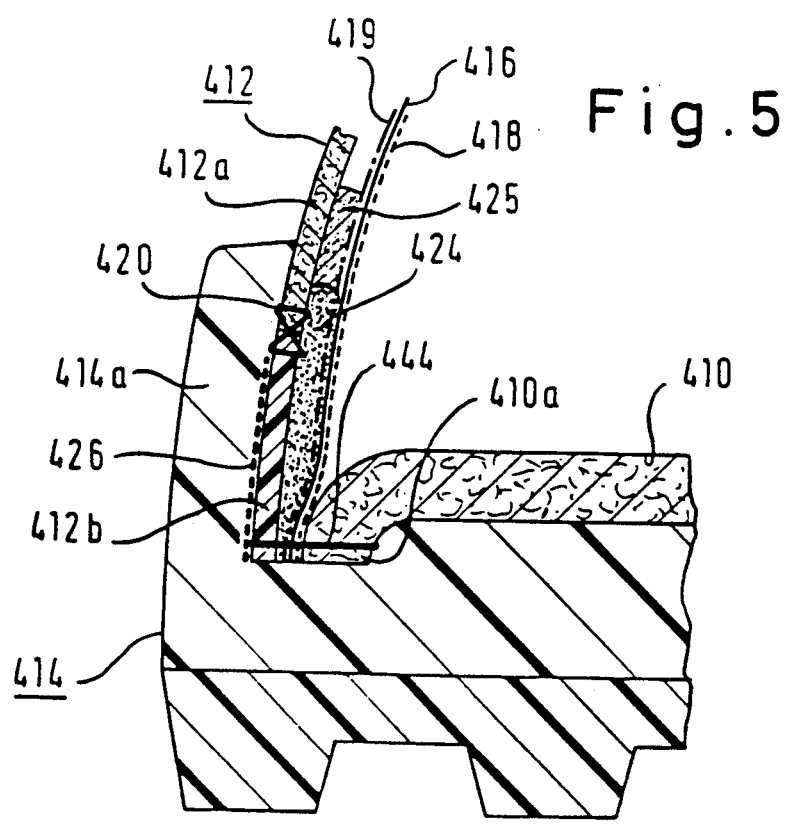

In FIG. 5, analogous parts are identified by the same reference numerals as in FIG. 1 but in each case increased by 400. Where this embodiment is concerned, the marginal strip 412b is connected to a downwardly angled-over part 410a of the insole 410 by a lock-stitch seam 444 which extends also through the waterproof lining 416 and through the sealant layer 424. For the rest, the sealing system corresponds to that shown in FIG. 1.

Figure 6:
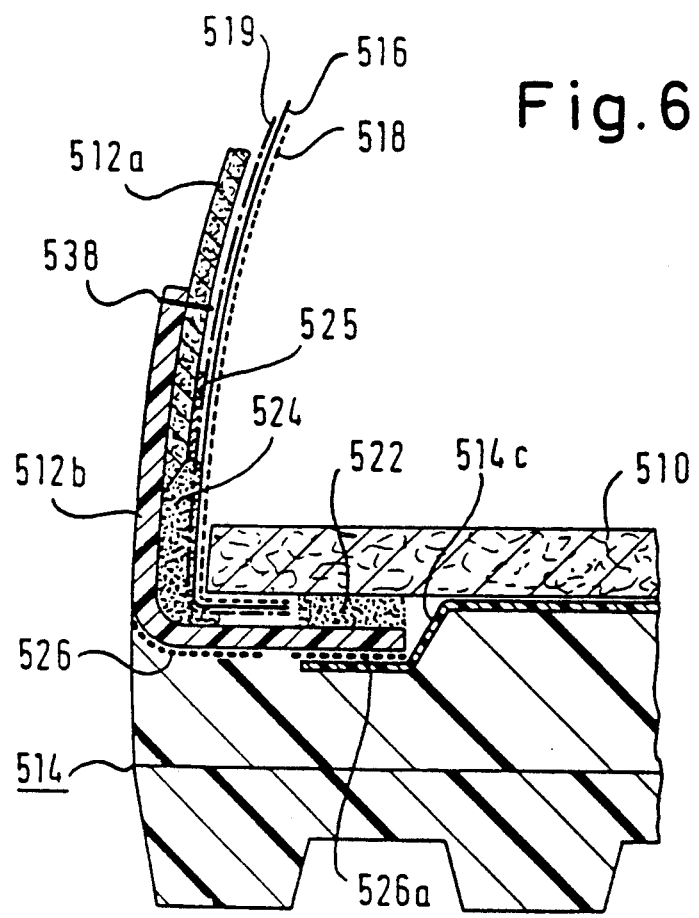

In the embodiment shown in FIG. 6, analogous parts are identified by the same reference numerals as in FIG. 4 but in each case increased by the number 200 (sic!). In this embodiment, as a sealing layer within the framework of the sole structure a film 514c is provided which is connected in sealing-tight manner to the marginal strip 512b by the adhesive layer 526a. For the rest, the sealing system corresponds to that shown in FIG. 4. With this embodiment, the sole structure below the film 514c could also be constructed from water-conductive material, particularly leather.

Figure 7:
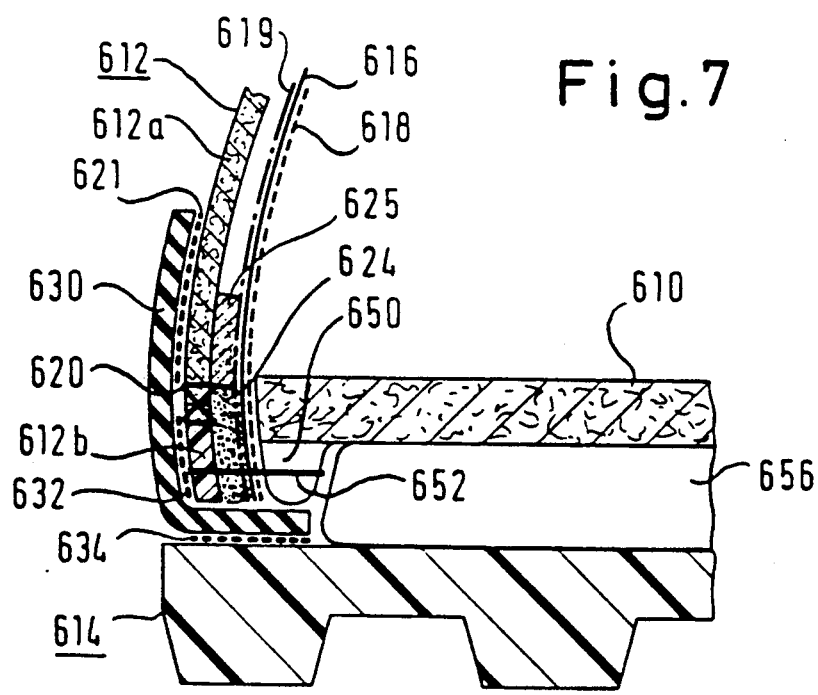

In FIG. 7, analogous parts are identified by the same reference numerals as in FIG. 1, in each case increased by the number 600. The insole 610 is in this case provided with an engaging lip 650 which may be glued or injection moulded onto the insole. An engaging seam 652 passes through the marginal strip 612b and the engaging lip 650 and—as shown—the seam 652 may also pass through the sealing composition 624 and the lining 616. The sole 614 is fixed in sealing-tight fashion to the connecting strip 630 by adhesion 634. Access of moisture to the underside of the insole 612 is out of the question, firstly due to the sealing-tight application of the sole 614 against the connecting strip 630 and secondly due to the sealing-tight application of the connecting strip 630 against the marginal strip 612b, at least in the area between the zig-zag seam 620 and the engaging seam 652 and thirdly by the sealing composition 624 which bears in sealing-tight fashion against the marginal strip 612b and the lining 616. The cavity formed by the engaging lip 650 is filled by a synthetic plastics part or filling 656.

Figure 8:
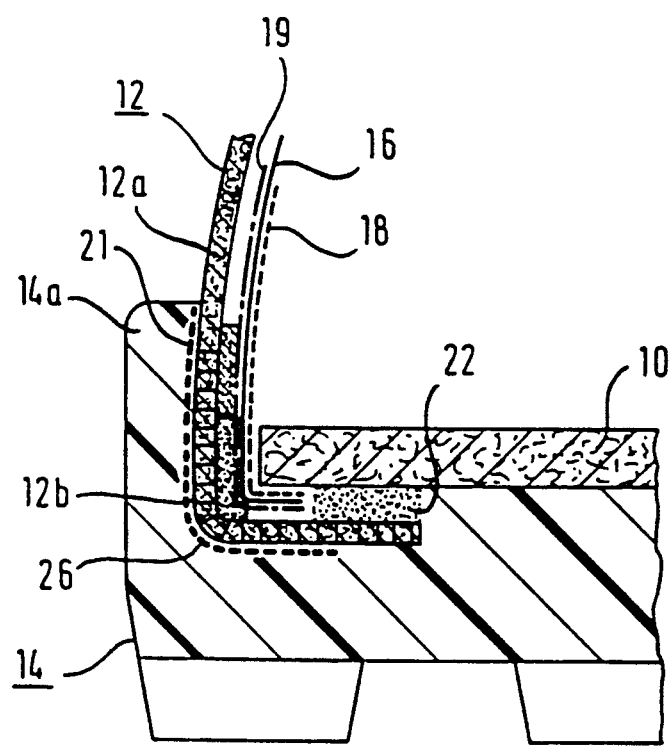

FIG. 8 shows a modified embodiment compared with FIG. 1 and in which the upper material 12a is integral with the marginal strip 12b and has been treated by impregnation as shown and described in connection with FIG. 1.

It should be pointed out once again that the sole 14 can also be injection moulded, once the marginal strip 12b has been fixed to the insole 10, but also in this case the layer 24 of sealing agent must first have been incorporated between the marginal strip 12b and the lining 16 as has been described in connection with FIGS. 9 to 11. This is also necessary because during injection moulding of a sole 14 the injection moulding composition cannot penetrate the marginal strip 12b.

I claim:

1. A method for producing a shoe, the shoe comprising an upper (12) connected to an insole (10), a sole structure (14) connected to the upper (12), and a substantially water proof lining (16), said upper (12) comprising a water conductive portion (12a) and a marginal strip (12b), wherein the water conductive portion (12a) has greater water conductivity than the marginal strip (12b), wherein the marginal strip (12b) is connected to the insole (10) and bears in a waterproof manner against the lining (16) through an interposed sealing composition (24), and wherein the sole structure (14) has at least one waterproof layer which is connected to the marginal strip (12b) in waterproof fashion, said method comprising (a) providing, as a separate intermediate product, an upper (12) comprising a marginal strip 12(b) and a portion (12a) of greater water conductivity than the marginal strip (12b);

(b) inserting a waterproofing lining (16) into the upper (12);

(c) introducing a sealing composition (24) in pastry or liquid form between said marginal strip (24b) and the water proof lining (16);

(d) attaching the marginal strip (12b) to an insole (10); and (e) attaching a sole structure 14 to the assemblage of the upper (12), waterproof lining (16), sealing composition (24) and insole (10), wherein the introduction of the sealing composition occurs independent of the attachment of the sole structure.

2. A method according to claim 1, wherein the marginal strip (12b) consists of a synthetic plastics material.

3. A method according to claim 1, wherein the marginal strip (12b) consists of a fibre fleece which, prior to being connected to the sole structure (14), is impregnated with an impregnating agent to suppress water-conductivity.

4. A method according to claim 1, wherein the marginal strip (12b) is formed by a leather strip which has been impregnated with an impregnating agent for the suppression of water-conductivity.

5. A method according to claim 1, wherein the marginal strip (12b) is produced independently of the upper material (12a) and is subsequently connected to the upper material (12a).

6. A method according to claim 5, wherein the marginal strip (12b) is sewn onto the upper material (12a).

7. A method according to claim 1, wherein the marginal strip (12b) is connected and is integral with the upper material (12a) and, prior to being joined to the sole structure (14), has been impregnated with an impregnating agent which suppresses water-conductivity.

8. A method according to claim 1, wherein the sealing means (24) between the marginal strip (12b) and the substantially waterproof lining (16) is confined to the area of the marginal strip (12b) and a narrow marginal area of the upper material (212a) along the line of connection (220) between the upper material (212a) and the marginal strip (212b).

9. A method according to claim 1, wherein the sealing agent (24) is bounded upwardly by a line of adhesion (25) between the waterproof lining (16) and the upper (12) within an intermediate space (27) between the waterproof lining (16) and the upper (12).

10. A method according to claim 1, wherein the sealing agent (24) is a polyurethane polyvinyl chloride, natural rubber or synthetic rubber based sealing agent.

11. A method according to claim 10, wherein the sealing agent 924) is a moisture-hardening polyurethane sealing agent.

12. A method according to claim 1, wherein the sealing agent (24) is a bi-component polyurethane sealing agent.

13. A method according to claim 1, wherein once it has set the sealing agent (24) is continuously flexible.

14. A method according to claim 1, wherein the waterproof lining (16) is coated with a textile layer (19) on its outside and the textile layer (19) is penetrated by the sealing agent (24).

15. A method according to claim 1, wherein the waterproof lining (16) above the sealing agent (24) rests loosely against the upper material (12a).

16. A method according to claim 1, wherein the marginal strip (12b) bears against and overlaps the underside of the insole (10) and is connected to the insole (10) in the overlapping zone.

17. A method according to claim 16, wherein in the area of overlap with the insole (10), the waterproof lining (16) ends before the marginal strip (12b) and in that in the area of overlap with the insole (10) and outside the edge of the lining, the marginal strip (12b) is connected to the insole (10) (at 22).

18. A method according to claim 17, wherein the marginal strip (12b) is connected to the insole (10) by a hot-melt glue (22).

19. A method according to claim 1, wherein the marginal strip, and the waterproof lining, are connected to the insole by a cross-sewn seam.

20. A method according to claim 1, wherein the marginal strip, and the waterproof lining, are fixed to a downward bent-over marginal zone of the insole by a lock-stitch seam.

21. A method according to claim 1, wherein the marginal strip, and the sealing agent and the waterproof lining, are sewn to a downwardly directed engaging lip of the insole.

22. A method according to claim 1, wherein the waterproof layer in the sole structure (14) is formed by an intermediate sole.

23. A method according to claim 1, wherein the waterproof layer of the sole structure is formed by a waterproof and vapour-permeable film.

24. A method according to claim 23, wherein when the marginal strip overlaps the underside of the insole, an area of the marginal strip which is close to the middle of the sole is glued in sealing fashion to the waterproof film while an area of the marginal strip which is more remote from the center of the sole is glued to an intermediate sole.

25. A method according to claim 23, wherein the marginal strip overlaps the underside of the insole, and an area of the marginal strip which is close to the middle of the sole is glued in sealing fashion to the waterproof film while an area of the marginal strip which is more remote from the centre of the sole is glued to an intermediate sole.

26. A method according to claim 1, wherein the waterproof lining (16) is provided with an inner coating (18) of textile-like material.

27. A method according to claim 1, wherein the waterproof lining (16) is coated with an outer protective coating (19) of fabric, and the sealing agent (24) penetrates the fabric protective coating (19) so that it bears closely against the waterproof lining (16), enclosing the threads of the fabric (19) in waterproof fashion, the threads of the fabric (19) not being water-conductive.

28. A method according to claim 1, wherein the substantially waterproof lining (16) is permeable to vapour.

29. A method according to claim 28, wherein the substantially waterproof lining (16) comprises a film of stretched polytetrafluoroethylene, a polyester membrane or a microporous layer of polyurethane.

30. A method according to claim 1, wherein the marginal strip (12b) is formed from a portion of the upper (12) which is integral with the water conductive portion 12(a) of the upper (12) and which is impregnated with an agent to reduce the water conductivity thereof.

31. A method according to claim 1, wherein the sealing means between the sealing means and the substantially waterproof lining is confined to the area of the marginal strip.

32. A method according to claim 1, wherein the marginal strip is connected to the insole by a cross-sewn seam.

33. A method according to claim 1, wherein the marginal strip is fixed to a downward bent-over marginal zone of the insole by a lock-stitch seam.

34. A method according to claim 1, wherein the marginal strip is sewn to a downwardly directed engaging lip of the insole.

35. A method according to claim 1, wherein the sealing means (24) between the marginal strip (12b) and the substantially waterproof lining (16) is confined to the area of the marginal strip (12b).

* * * * *

UNITED STATES PATENT AND TRADEMARK OFFICE
CERTIFICATE OF CORRECTION

PATENT NO. : 5,285,546

DATED : February 15, 1994

INVENTOR(S) : Franz Haimerl

It is certified that error appears in the above-identified patent and that said Letters Patent is hereby corrected as shown below:

Col. 2, delete lines 1 through 10 in their entirety;
Col. 4, line 53, "Prior" should read --prior--;
Col. 6, line 52, "Strip" should read --strip--;
Col. 6, line 53, "Sealing-tight" should read --sealing-tight--;
Col. 11, line 7, "pastry" should read --pasty--;
Col. 11, line 8, "(24b)" should read --(12b)--;
Col. 11, line 55, "924)" should read --(24)--.

Signed and Sealed this

Twenty-sixth Day of July, 1994

Attest:

BRUCE LEHMAN

Attesting Officer

Commissioner of Patents and Trademarks